(12) United States Patent
Yuter

(10) Patent No.: US 7,669,636 B1
(45) Date of Patent: Mar. 2, 2010

(54) GLARE BLOCKING VEHICLE ATTACHMENT

(76) Inventor: Seymour C. Yuter, 407 Cedar Dr. West, Briarcliff Manor, NY (US) 10510

( * ) Notice: Subject to any disclaimer, the term of this patent is extended or adjusted under 35 U.S.C. 154(b) by 0 days.

(21) Appl. No.: 11/890,409

(22) Filed: Aug. 6, 2007

(51) Int. Cl.
*B60J 11/00* (2006.01)
*B60J 3/00* (2006.01)

(52) U.S. Cl. .................. 160/370.21; 296/97.1
(58) Field of Classification Search .......... 160/89, 160/90, 370.21, 80; 296/97.1
See application file for complete search history.

(56) References Cited

U.S. PATENT DOCUMENTS

| | | | | |
|---|---|---|---|---|
| 2,234,804 A | * | 3/1941 | Murray | 160/169 |
| 3,174,195 A | * | 3/1965 | Francis | 52/3 |
| 5,409,286 A | * | 4/1995 | Huang | 296/136.04 |
| 5,509,713 A | * | 4/1996 | Hou | 296/138 |
| 5,570,734 A | * | 11/1996 | Wu | 160/370.21 |
| 5,588,476 A | * | 12/1996 | Trethewey | 160/370.21 |
| 5,760,558 A | * | 6/1998 | Popat | 318/480 |
| 6,598,650 B1 | * | 7/2003 | Palmer | 160/236 |

OTHER PUBLICATIONS

Springs Window Fashions LP, Window Treatment Horizontal Blinds, Bali Incline Wire Mini Blinds, Revised May 2002; downloaded from http://www.windowworldhi.com/Specifications/GraberBaliNanik/Horizontal%20Blinds/Aluminum/ss_21510000.pdf; 2 pages.*

* cited by examiner

*Primary Examiner*—Katherine W Mitchell

(57) ABSTRACT

A method of reducing glare from oncoming vehicle headlights is provided comprising providing an attachment for a vehicle having a front windshield, a driver's side and a passenger side, the attachment comprising a slatted blind having a plurality of horizontally-oriented slats extending between a headrail and a bottom rail, a flexible cord ladder connected between the headrail and bottom rail and supporting the slats, and a rotating means for rotation of the slats from opened to closed. Securing the slatted blind with mounting means connected to the headrail to an upper portion of the inside of the vehicle's front windshield on the driver's side such that the attachment has a width less than 30 percent of the horizontal width of the vehicle's front windshield and the passenger side is uncovered. Driving the vehicle on a surface that can have oncoming traffic. Rotating the rotating means to operate the slats such that they are open and allow a driver to see through the slats when there is no oncoming traffic with lit headlights approaching. Rotating the rotating means while driving to operate the slats such that they are closed and prevent a driver from seeing through the slats when there is at least one oncoming vehicle with lit headlights approaching the driver. And repeating the rotating steps while driving to accommodate varying oncoming traffic.

22 Claims, 3 Drawing Sheets

GLARE BLOCKING VEHICLE ATTACHMENT

BACKGROUND OF THE INVENTION

1. Field of the Invention

This invention pertains to safety attachments for vehicles and more particularly to a method using an attachment to block the beams of headlights of oncoming vehicles to prevent dangerous and even blinding glare, mainly in the eyes of older drivers, particularly on two lane roads, and especially when it is raining.

2. Background of the Invention

Driving requires effective coordination of visual, motor and cognitive skills. Visual skills are pushed to their limit at night by decreased illumination and by disabling glare from oncoming headlights. Glare is proportional to headlight brightness so increasing headlight brightness also increases potential glare for oncoming drivers, particularly on two lane roads and especially in the rain. This problem is worse for older drivers because of their increased intraocular light scattering, glare sensitivity and photstress recover time.

Modern vehicle headlights are electrically operated, positioned in pairs, one or two on each side of the front of a vehicle. A headlight system produces a low and a high beam. High beams are used when other vehicles are not present on the oncoming side of the road. Low beams have stricter control of upward light, and direct most of their light downward and either rightward (in right-traffic countries) or leftward (in left-traffic countries) to provide safe forward visibility without excessive glare.

A night driving problem, particularly for older drivers on two lane roads, and especially when it is raining, is that oncoming high beams can be blinding, and even oncoming low beams can cause dangerous glare. That is because, with increasing age, cataracts in the eye's lens scatter the oncoming light.

A cataract is the clouding of the normally transparent lens within the eye. The lens is located directly behind the pupil and normally assists in focusing light for clear vision. As the cataract worsens it prevents light from coming through the pupil and focusing clearly on the retina. Early changes may be very minor, but as the process continues symptoms of blurred vision, light sensitivity, glare and night driving difficulties increase. The nighttime driving difficulties are mainly caused by headlight glare. It takes a typical driver ten seconds to recover from headlight glare and this time increases with age. At 30 miles an hour a car travels an eighth of a mile in 10 seconds.

This nighttime driving problem has intensified with vision-disabling nighttime glare from three types of headlights mounted on the front of motor vehicles: "high intensity discharge" (HID) lights that appear blue, auxiliary lights such as "fog lamps", and headlights mounted high on various light trucks (sport utility vehicles, pickups and vans).

Finally, nighttime driving difficulties from headlights and glare are exacerbated in the rain and especially heavy rain to the point that an older driver can be blinded.

BRIEF SUMMARY OF THE INVENTION

A general object of the invention is to improve the safety of nighttime drivers.

Another object of the invention is to improve the safety of older drivers, particularly when driving on two lane roads and especially in the rain.

A specific object of the invention is to provide an attachment for a vehicle which can block the headlight beams from oncoming vehicles to prevent dangerous glare in the eyes of a driver, particularly older drivers when on two lane roads, and especially in the rain.

Briefly, in accordance with the preferred embodiment of the invention, a method of reducing glare from oncoming vehicle headlights is provided comprising providing an attachment for a vehicle having a front windshield, a driver's side and a passenger side, the attachment comprising a slatted blind having a plurality of horizontally-oriented slats extending between a headrail and a bottom rail, a flexible cord ladder connected between the headrail and bottom rail and supporting the slats, and a rotating means for rotation of the slats from opened to closed. Securing the slatted blind with mounting means connected to the headrail to an upper portion of the inside of the vehicle's front windshield on the driver's side such that the attachment has a width less than 30 percent of the horizontal width of the vehicle's front windshield and the passenger side is uncovered. Driving the vehicle on a surface that can have oncoming traffic. Rotating the rotating means to operate the slats such that they are open and allow a driver to see through the slats when there is no oncoming traffic with lit headlights approaching. Rotating the rotating means while driving to operate the slats such that they are closed and prevent a driver from seeing through the slats when there is at least one oncoming vehicle with lit headlights approaching the driver. And repeating the rotating steps while driving to accommodate varying oncoming traffic.

The slatted blind is designed for a skylight in a home. The invention in a nutshell is to use a slatted blind designed for skylights to reduce glare while driving.

A feature of the invention is that the window blind turning rod is positioned so its outer end is adjacent to the steering wheel so it can be turned with a thumb and one or two adjacent fingers while the remaining fingers grasp the steering wheel for safer driving.

Another feature of the invention is a suction cup attached to the upper left portion of the windshield to retain the window blind's lift cords out of the driver's road view path for safer driving.

Still another feature of the invention is resting the inside lower corner of the window blind on the horizontal surface of the vehicle's dashboard to help maintain the window blind in a substantially vertical position.

A further feature of the invention is that the lower right end of the window blind is detachably attached to the top horizontal surface of the vehicle's dashboard to help maintain the window blind in a substantially vertical position.

A still further feature of the invention is a suction cup-hook mounted at the bottom inside surface of the vehicle's slanted front windshield for connection to the slack wire that passes through the slat openings and the bottom rail opening and extends toward the slanted front windshield to help maintain the window blind in a substantially vertical position. That is contrary to the prior art slanted window house installation where the wire is taut and tightly anchored to the window frame below the bottom rail to maintain the window blind adjacent to and parallel to the slanted window.

DESCRIPTION OF THE RELATED ART

Venetian window blinds are used not only for windows of housing structures but also across the full width of rear and rear side vehicle windows to protect the vehicle and its passengers from direct sunlight. The rays of the sun can damage the interiors of most vehicles over time. Window blinds also block the sun from heating the interior of a vehicle. Usually, these window blinds are pulled up for nighttime driving so as not to block vision through the windows.

Another device for blocking sunlight through a front windshield is an accordion-folded retractable sun shade which is adhered to the sloping windshield pillar on the passenger's side of a vehicle and can be drawn over the full length of the windshield during the day, and is fully retracted for driving.

There is also a retractable visor with tinted slats positioned over all of the upper half of a vehicle's front windshield to protect from dangerous sun glare. However, the lower half of the windshield is not blocked so if used at night the visor would not block oncoming headlight glare.

The window blind of the invention, totally opposite to these teachings, when activated to block oncoming headlight glare, only blocks part of the driver's side of a vehicle's front windshield and thus the view of the oncoming traffic lane, so the driver can see all of the vehicle's lane, and is used only at nighttime to block glaring and blinding headlight beams of oncoming vehicles in the oncoming lane, especially on two lane roads and in the rain.

Most importantly, there is no suggestion of this invention in the 110-page publication prepared for The AAA Foundation for Traffic Safety, Washington, D.C., in December 2001, entitled "Countermeasures for Reducing the Effects of Headlight Glare." This AAA publication also reports that as many as 50 percent of all headlights on the road may be misaimed, further aggravating the problem of headlight glare.

BRIEF DESCRIPTION OF THE DRAWINGS

Other objects, features and advantages of the invention will be apparent from the following description taken together with the accompanying drawings in which.

DESCRIPTION OF THE PREFERRED EMBODIMENT OF THE INVENTION

Figure 1:
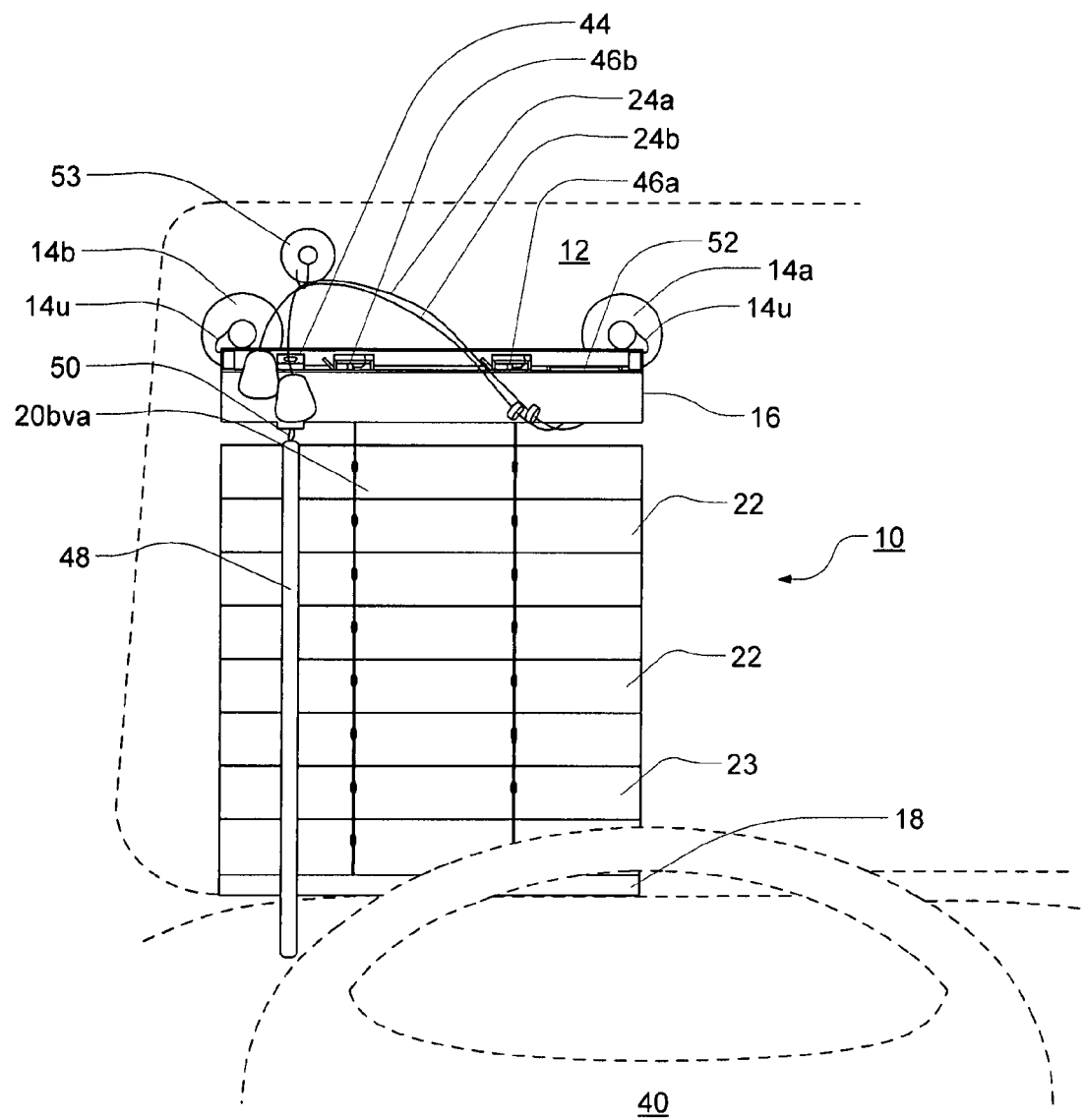
FIG. 1 is a front elevational view taken from the driver's seat of a vehicle showing a glare blocking vehicle attachment in accordance with the preferred embodiment of the invention in which the window blind covers less than the left quarter area of the vehicle's front windshield, with suction cups connecting the upper corners of the window blind to the inside surface of the vehicle's windshield, and with the window blind's slats closed to block oncoming headlight glare. Also shown is a suction cup-hook connected to the upper left portion of the windshield for retaining the window blind lift cords out of the driver's viewing path.

In accordance with the preferred embodiment of the glare blocking vehicle attachment method invention, window blind 10 (FIG. 1) is attached to the upper inside surface of the vehicle's front windshield 12 by a pair of suction cup connectors 14a and 14b, each 2.5 inches in diameter.

Window blind 10 (FIG. 2) comprises the headrail 16, the bottom rail 18 and the flexible cord ladders 20a and 20b connected between the headrail 16 and the bottom rail 18. Each suction cup connector 14 (FIG. 1) has its hook bent into a shallow U 14u with its free end inserted into an opening 16o (FIG. 2) at the upper inside corner edge of headrail 16 nearest windshield 12 to mount the headrail 16 via each suction cup connector 14 to the inside surface of windshield 12 by suction.

Each of the cord ladders 20a and 20b (FIG. 2) comprises a pair of parallel vertical cords respectively 20ava and 20avb and 20bva and 20bvb connected respectively by spaced ladder rungs 20ar and 20br. Each of a plurality of slats 22 is loosely supported in matching ladder rungs 20ar and 20br of the cord ladder 20. Each of the slats 22 has a shallow oval hole 22ha and 22hb respectively near each outer end. Lift cords 24a and 24b are connected between the headrail 16 and the bottom rail 18 respectively through the holes 22ha and 22hb. The bottom ends of lift cords 24 are fixedly connected to bottom rail 16 so that when the lift cords 24 are pulled up, they pull the bottom rail 16 up compressing slats 22 together as shown in FIG. 3.

Flexible steel incline wires 26a and 26b (FIG. 2) are connected to headrail 16 and parallel the lift cords 24a and 24b through holes 22ha and 22hb. They pass through openings 18a and 18b respectively in bottom rail 18 and connect to lower suction cup-hooks 28a and 28b which are suction connected to the lower edge of windshield 12 below suction cup connectors 14a and 14b. Suction cup-hooks 28a and 28b are also each 2.5 inches in diameter. The portions of the flexible steel incline wires 26a and 26b between the bottom rail 18 and suction cup-hooks 28a and 28b are slack to allow the window blind 10 to hang vertically downward rather than along the inside surface of windshield 12 if the steel incline wires 26 were pulled tight (as in conventional inclined window house installations). The bottom ends of the steel incline wires 26a and 26b respectively pass through the pinched hook portions 28ah and 28bh of the suction cup-hooks 28a and 28b, then double back and are twisted together to make the connections. This arrangement allows the lengths of the steel incline wires 26a and 26b to be adjusted during installation of the window blind 10 so that the bottom rail 18 hangs vertically downward. When the window blind 10 is vertical there is maximum spacing between the slats 22 to allow for unobstructed vision through slats 22 when they are in open (horizontal) position.

The right bottom end of bottom rail 18 (FIG. 2) has an adhered female VELCRO strip 30a which is detachable connectible to the matching male VELCRO strip 30b adhered to the top surface of the upper horizontal portion 32 of the dash panel 34 to anchor the right bottom end so that the bottom rail 18 does not move during vehicle movement. However, the upper horizontal portion 32 descends downwardly on its left side so that the left end of the bottom rail 18 is supported only by the steel incline wire 26b. Thus the bottom rail 18 is essentially fixed in a substantially horizontal position and the window blind 10 does not move with vehicle movement. For daylight driving the bottom rail 18 is detached from the VELCRO strip 30*b* and raised together with the slats 22 as shown in FIG. 3.

The right edge of the window blind 10 (FIG. 1) is vertically aligned with the vertically central third portion of the steering wheel 40. Preferably the right edge of window blind 10 is vertically aligned with a vertical line through the center of steering wheel 40 as shown in FIG. 1.

Headrail 16 (FIG. 3) comprises a centrally aligned hexagonal turn axle 42 which passes through a matching center hexagonal opening of gear box 44 and also matching center hexagonal openings of ladder cord drums 46*a* and 46*b*. Rod 48 is connected to gear box 44 via a rotatable loop-shaped link 50 (FIG. 1). The vertical ladder cords 20*ava* and 20*avb* (FIG. 2) are connected to ladder cord drum 46*a* and the vertical ladder cords 20*bva* and 20*bvb* are connected to ladder cord drum 46*b*. When the window blind 10 is in the open position the ladder cord rungs 20*ar* and 20*br* are horizontal so the slats 22 are horizontal. That is because the ladder cord drums 46*a* and 46*b* are in a rotate position so that the vertical ladder cords 20*ava* and 20*avb* are of equal length as are the vertical ladder cords 20*bva* and 20*bvb*. In that position of the window blind 10 there is maximum vision between slats 22 because they are horizontal.

To close window blind 10 with slats 22 in a substantially vertical position as shown in FIG. 1, the rod 48 (FIG. 2) is turned counter clockwise, which operates the gear box 44 to rotate turn axle 42 clockwise so that the ladder cord drums 46*a* and 46*b* rotate clockwise pulling the vertical ladder cords 20*avb* and 20*bvb* up so that the ladder cord rungs 20*ar* and 20*br* are moved to a substantially vertical position rotating slats 22 to a substantially vertical position and closing the window blind 10, blocking any vision through window blind 10. To open window blind 10 turn rod 48 is turned clockwise, which operates the gear box 44 to rotate turn axle 42 counter clockwise so that the ladder cord drums 46*a* and 46*b* rotate counter clockwise pulling the vertical ladder cords 20*ava* and 20*bva* upwards so that the ladder cord rungs 20*ar* and 20*br* are moved to an horizontal position rotating slats 22 to the horizontal position and opening window blind 10.

Thus the window blind 10 can be open when there is no oncoming vehicle headlight glare and closed when there is oncoming vehicle headlight glare, to avoid temporarily blinding the driver.

The window blind 10 (FIG. 1) is mounted on the inside surface of the windshield 12 so that the external tip of turn rod 48 is adjacent the left side of the steering wheel 40 so the driver can rotate the turn rod 48 with two or three fingers of the left hand to open and close the slats 22 while the remaining fingers hold the steering wheel 40 to increase driving safety.

Headrail 16 (FIG. 2) at its inner right end has a lift cord control 52 through which the lift cords 24*a* and 24*b* pass. When the lift cords 24 are pulled to the left, lift cord control 52 allows slats 22 together with bottom rail 18 to be moved up and down. When the lift cords 24 are pulled to the right, lift cord control 52 grasps the lift cords 24 so that they are fixed at their then positions. So the slats 22 of window blind 10 can be raised vertically by lift cords 24 to retract and compress the slats 22 together and thus compress the window blind 10 in a raised position for daylight driving as shown in FIG. 3. A suction cup-hook 53 is attached to the upper left portion of the windshield 12 for retaining the window blind lift cords 24 out of the driver's vision path when window blind 10 is retracted for daylight driving or in its lowered position for nighttime driving. Suction cup-hook 53 is one and a quarter inch in diameter.

Figure 2:
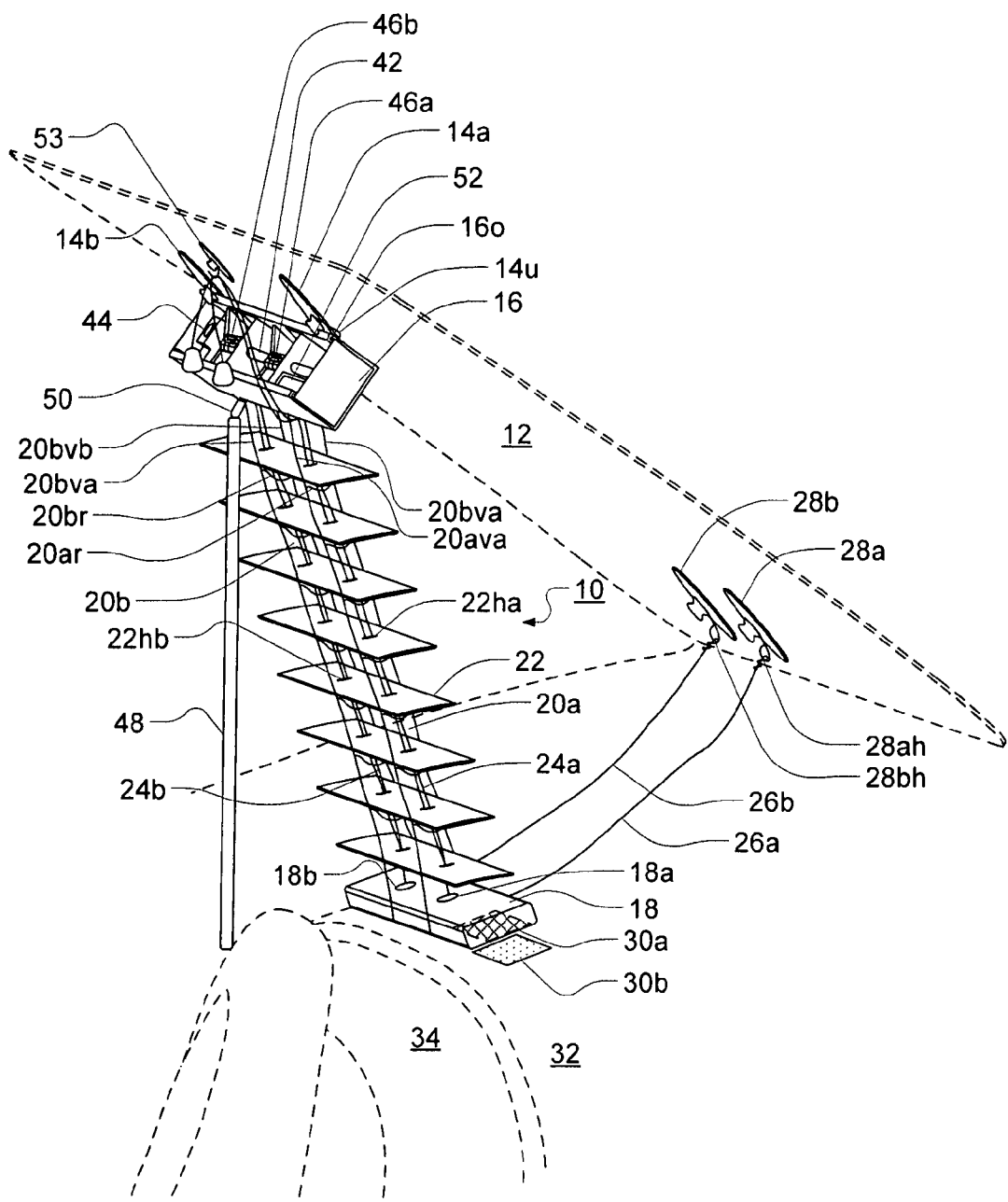
FIG. 2 is a side perspective view of the glare blocking vehicle attachment of FIG. 1 showing the turning rod, which has opened the slats of the window blind, hanging from a corner of the window blind with its external tip adjacent the steering wheel so the driver can rotate the turning rod with two or three fingers of one hand to open and close the slats while the remaining fingers hold the steering wheel; and also showing the inside lower corner of the window blind detachably attached to the horizontal surface of the vehicle's dashboard to help prevent the window blind from moving while the vehicle is in motion.
Figure 3:
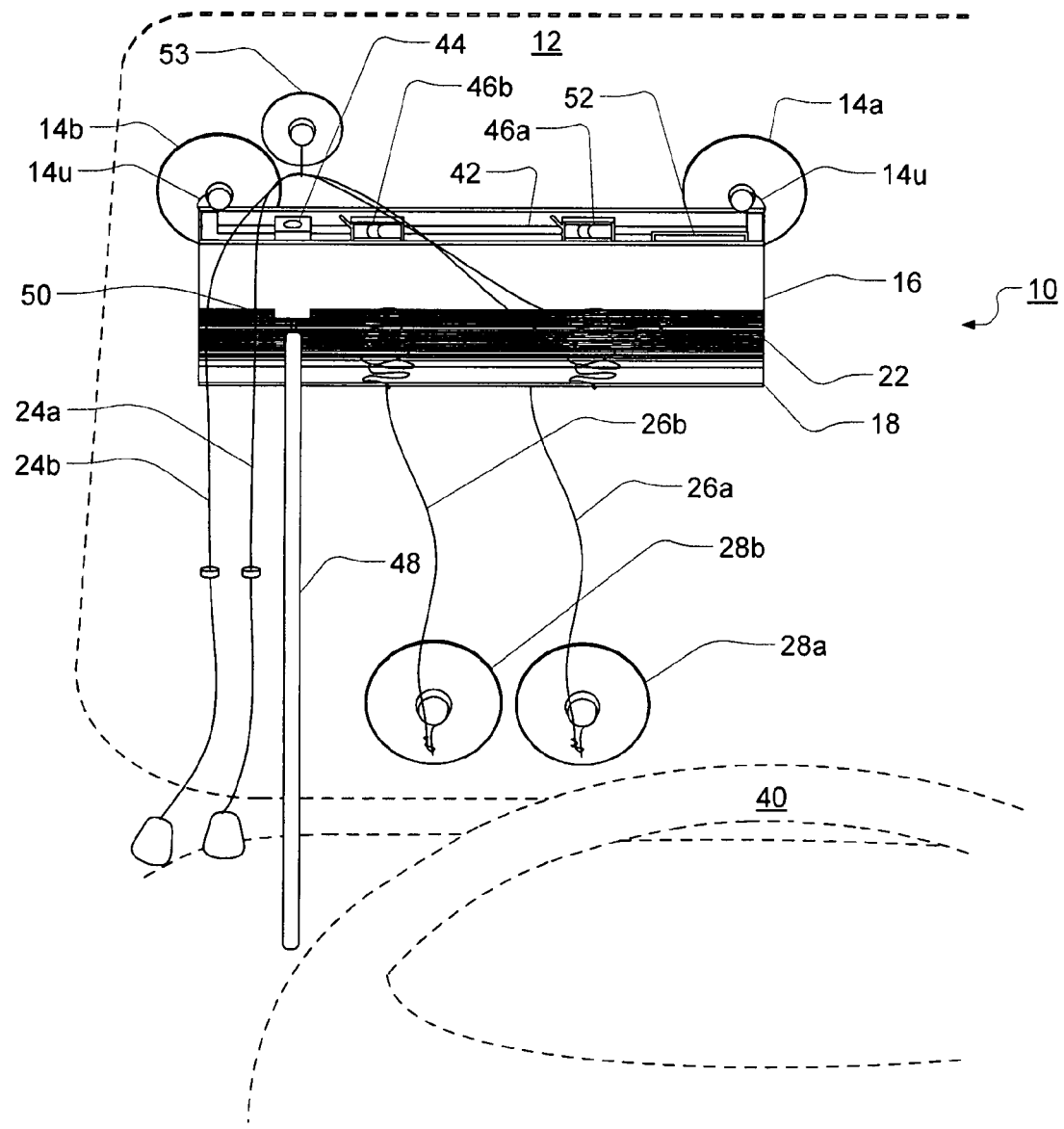
FIG. 3 is a front elevational view of the glare blocking windshield attachment of FIGS. 1 and 2 with the slats of the window blind pulled all the way up and out of the way for daylight driving, and showing slack incline wires of the window blind connected to suction cups-hooks attached to the lower inside of the windshield to help prevent movement of the window blind during vehicle movement. The left incline wire also supports the lower left corner of the window blind in the space above the left-declining horizontal surface of the vehicle's dashboard so that its bottom rail is substantially horizontal to facilitate easy rotation of the slats from the open to the closed position when the slats are down.

In night operation the window blind 10 is normally in the open position (FIG. 2). When oncoming vehicle headlights are in the distance, the window blind is closed by turn rod 48 (FIG. 1) to block the headlight glare from the oncoming vehicle. The driver can view the driver's side of the road through the unblocked windshield 12 to the right of the window blind 10. Moreover, when desired, the driver can move his or her torso to the right to see more of the left side of the road, and still more by tilting the head to the right. Also, for left turns, the window blind 10 must be open (FIG. 2) to see the right (driver's) side of the road.

In the vehicle headlight glare blocking attachment as reduced to practice, window blind 10 is a commercial window blind manufactured by Springs Window Fashions of Middleton, Wis. Its construction and operation are well known in the window blind art, though discussed in some detail herein. The commercial window blind has the following specification under the title "Bali Classics 8GA": "Horiz Tension Wire, WIDTH-9, HEIGHT-14, 7205-White Satin, O-Outside Mount, L-Left Tilt, R-Right Lift, W-Wand Tilt, 6" Wand, 215-Ladder Spacing 21.5 mm." The retail cost of the commercial window blind is around $30. There is no need for the mounting brackets provided to mount the window blind in a window. Instead, suction cups are used to mount the window blind on the inside surface of the vehicle's front windshield as disclosed herein. Also, the slope of the front windshield is around 45 degrees with respect to the horizontal while the window blind 10 is substantially vertical, or 90 degrees.

In the preferred embodiment of the invention there are two modifications of this commercial window blind. One is the addition at the lower right surface of the bottom rail 18 of the VELCRO attachment 30 to detachably connect the right end of the bottom rail 18 (FIG. 2) to the top surface 32 of the vehicle's dash board 34. The other modification is to change the gear ratio of the gear box 44 so that a single 360 degree rotation clockwise of the rod 48 fully opens window blind 10 and a single 360 degree rotation counter clockwise closes window blind 10. In the commercial window blind's gear box multiple turns are needed to both open and close the window blind.

In the vehicle headlight glare blocking attachment method as reduced to practice the slatted window blind is nine inches wide. The width of the vehicle's front windshield varies from 65 inches at its widest to 49 inches at its top. The windshield width along its vertical center in line with the top of the steering wheel is 55 inches. So the percentage of the width of the window blind to the width of the windshield is, respectively, 14 percent (at its widest), 18 percent (at the top) and 16 percent (at the vertical center). Correspondingly, the unblocked portion of the windshield to the right of the window blind is, respectively, 86 percent, 82 percent and 84 percent. The applicable New York State law, New York State Vehicle & Traffic Law Section 375 12-(b)(1) states: "No person shall operate any motor vehicle upon any public highway, road or street, the front windshield of which is composed of, covered by or treated with an), material which has a light transmittance of less than seventy percent unless such materials are limited to the uppermost six inches of the windshield." To the extent that law is applicable to the vehicle headlight glare blocking attachment method according to the invention, when the window blind is closed, the unblocked portion of the windshield is at least 82 percent, not counting the unblocked portion of the windshield to the left of the window blind. So the invention fully complies with this New York State law and, presumably, the corresponding laws of many other municipalities. For windshields of smaller width than 49 inches, the width of the window blind can be reduced to less than nine inches in order to comply with any applicable law.

Also, the commercial window blind had a height of 14 inches when fully open. In the invention as reduced to practice only about nine inches of slats 22 height is used, the remaining slats 22 at the bottom resting together on the bottom rail 18 (FIG. 2), which is resting on the horizontal surface 32 of the vehicle's dash board 34. However, for drivers taller than the inventor (5' 6"), the window blind can be mounted higher on the inside surface of a windshield with a longer height.

While the invention has been described for use in countries where the convention is to drive on the right side of a road, in those countries with a convention of driving on the left side of the road, as in England, the window blind 10 is mounted on the right side of the windshield above the right side of the steering wheel and operates in a substantially mirror image to that of right side road driving.

Thus, in accordance with the invention, a glare blocking vehicle attachment method has been provided accomplishing all of the objects, and having the features and advantage specified at the beginning of this specification.

What is claimed is:

1. A method of reducing glare from oncoming vehicle headlights, said method comprising:

Providing an attachment for a vehicle front windshield, said vehicle having a driver's side and a passenger side, said attachment further comprising:

A slatted blind having a plurality of horizontally-oriented slats extending between a headrail and a bottom rail, a flexible cord ladder connected between the headrail and bottom rail and supporting said slats, and a rotating means for rotation of said slats from opened to closed;

Securing said slatted blind with mounting means connected to said headrail to an upper portion of the inside of the vehicle's front windshield on the driver's side such that the attachment has a width less than 30 percent of the horizontal width of the vehicle's front windshield and the passenger side is uncovered;

Driving said vehicle on a surface that can have oncoming traffic;

Rotating the rotating means to operate the slats such that they are open and allow a driver to see through the slats when there is no oncoming traffic with lit headlights approaching;

Rotating the rotating means while driving to operate the slats such that they are closed and prevent a driver from seeing through the slats when there is at least one oncoming vehicle with lit headlights approaching the driver; and Repeating the rotating steps while driving to accommodate varying oncoming traffic.

2. A method of reducing glare from oncoming vehicle headlights according to claim 1 wherein the vehicle has a steering wheel and said rotating means is a rotatable rod, and securing said slatted blind to the upper portion of the front windshield at a position so the outer tip of the rotatable rod hangs downward adjacent the driver's side of the vehicle's steering wheel, and rotating the rotatable rod with the thumb and forefinger of the driver's side hand while remaining fingers grasp the steering wheel to open and close the slats of the slatted blind.

3. A method of reducing glare from oncoming vehicle headlights according to claim 2 wherein the outer tip of said rotatable rod is adjacent the left side of the vehicle's steering wheel and rotating the rotatable rod with the thumb and forefinger of the driver's left hand while remaining fingers grasp the steering wheel.

4. A method of reducing glare from oncoming vehicle headlights according to claim 2 wherein a single 360 degree rotation of said rotatable rod fully opens the window blind and a single 360 degree rotation of the rotatable rod in a direction opposite the direction of said single 360 degree rotation of the rotatable rod fully closes the window blind.

5. A method of reducing glare from oncoming vehicle headlights according to claim 1 wherein the vehicle has a steering wheel and said slatted blind is secured to the inside front windshield so that the slatted blind hangs vertically downward and the side of the slatted blind opposite the driver's side is substantially vertically aligned with the steering wheel's central portion, and a portion of the front windshield above the side of the steering wheel beyond the side of the slatted blind opposite the driver's side together with the remaining portion of the front windshield is unblocked by the slatted blind so the driver can always see the vehicle's side of a road through the unblocked portion of the front windshield.

6. A method of reducing glare from oncoming vehicle headlights according to claim 1 wherein the headrail of said slatted blind is secured by suction cup mounting means to an upper portion of the inside of the vehicle's front windshield on the driver's side.

7. A method of reducing glare from oncoming vehicle headlights, said method comprising:

Providing an attachment for a vehicle front windshield, said vehicle having a driver's side and a passenger side, said attachment further comprising:

A slatted blind having a plurality of horizontally-oriented slats extending between a headrail and a bottom rail, a flexible cord ladder connected between the headrail and bottom rail and supporting said slats, and a rotating means for rotation of said slats from opened to closed;

Slat movement means to raise and lower said slats of said slatted blind with respect to said headrail, said slat movement means comprising one lift cord for raising the slats near an end on one side of the slatted blind and a second lift cord for raising the slats near an end on the other side of the slatted blind whereby said slats can be retracted to a raised position during daylight driving;

At least one wire extending from the headrail through a respective hole near an end of each slat and through a hole in the bottom rail such that the at least one wire is slack;

Securing said slatted blind with mounting means to the inside front windshield such that the attachment covers at least a portion of the driver's side of the vehicle's front windshield, and the attachment has a width less than 30 percent of the horizontal width of the vehicle's front windshield and the passenger side is uncovered;

Driving said vehicle on a surface that can have oncoming traffic;

Rotating the rotating means to operate the slats such that they are open and allow a driver to see through the slats when there is no oncoming traffic with lit headlights approaching;

Rotating the rotating means while driving to operate the slats such that they are closed and prevent a driver from seeing through the slats when there is at least one oncoming-vehicle with lit headlights approaching the driver; and Repeating the rotating steps while driving to accommodate varying oncoming traffic.

8. A method of reducing glare from oncoming vehicle headlights according to claim 7 and bending said wire where it exits from said bottom rail about 90 degrees and extending the wire toward the lower inside of the front windshield to help maintain said slatted blind substantially vertical during vehicle movement.

9. A method of reducing glare from oncoming vehicle headlights according to claim 8 and connecting said wire extending toward the lower inside of the front windshield by a suction cup to the lower portion of the front windshield.

10. A method of reducing glare from oncoming vehicle headlights according to claim 7 and bending said wire where it exits from said bottom rail about 90 degrees and extending the wire toward the lower inside of the front windshield to help maintain the bottom rail of said slatted blind substantially horizontal during vehicle movement.

11. A method of reducing glare from oncoming vehicle headlights according to claim 7 wherein the vehicle has a dashboard with an upper surface and detachably connecting the end of said bottom rail opposite the driver's side to the dashboard's upper surface to help maintain the slatted blind in a substantially vertical position during vehicle movement.

12. A method of reducing glare from oncoming vehicle headlights according to claim 11 and detachably unconnecting the end of said bottom rail opposite the driver's side from said dashboard's upper surface when said slatted blind is raised to said retracted position.

13. A method of reducing glare from oncoming vehicle headlights according to claim 12 wherein said detachably connecting and detachably unconnecting the end of said bottom rail opposite the driver's side to said dashboard's upper surface uses VELCRO connecting means.

14. A method of reducing glare from oncoming vehicle headlights according to claim 7 and connecting the lift cords by a suction cup to the upper inside surface of the driver's side of the front windshield to retain the lift cords out of the driver's vision path when said slatted blind is retracted during daylight driving.

15. A method of using an existing window blind to block glare from oncoming vehicle headlights, comprising
providing an existing window blind which further comprises:
a headrail, a bottom rail with an opening adjacent one end, flexible ladder means connected between the headrail and the bottom rail, a plurality of horizontal slats supported by the flexible ladder means, each of the slats having an opening substantially aligned with the bottom rail opening, a wire connected to the headrail passing through the slat openings and through the bottom rail opening, and rotating means connected to the headrail for rotating the slats from opened to closed, said method further comprising the steps of:
(A) Attaching the window blind by a suction cup to the upper portion of the inside surface of the driver's side of a slanted front windshield of a vehicle also having a dashboard with an upper surface and a steering wheel so the window blind hangs vertically downward and more than 70 percent of the horizontal width of the slanted front windshield is unblocked by the window blind so the driver can always see the vehicle's side of a road through the unblocked portion of the slanted front windshield;
(B) Bending the wire where it exits from the bottom rail about 90 degrees and extending the wire over the dashboard's upper surface toward the lower inside of the slanted front windshield to help keep the window blind substantially vertical and the bottom rail substantially horizontal during vehicle motion;
(C) Driving said vehicle on a surface that can have oncoming traffic;
(D) Opening the slats with the rotating means to allow a driver to see through the window blind; (E) Closing the slats with the rotating means when there is an oncoming vehicle with glaring headlights to block the glare; and
(F) Repeating the rotating steps while driving to accommodate varying oncoming traffic.

16. The method of using an existing window blind to block glare from oncoming vehicle headlights, according to claim 15, wherein the side of the window blind opposite the driver's side is substantially vertically aligned with said steering wheel's central portion, and the portion of the slanted front windshield beyond the side of the window blind opposite the driver's side is unblocked by the window blind so the driver can always see the vehicle's side of a road through the unblocked portion of the slanted front windshield.

17. The method of using an existing window blind to block glare from oncoming vehicle headlights, according to claim 15, wherein said rotating means is a rotatable rod, and securing the window blind to the upper portion of the slanted front windshield at a position so the outer tip of the rotatable rod hangs downward adjacent the driver's side of said steering wheel, and rotating the rotatable rod with the thumb and forefinger of the driver's side hand while remaining fingers grasp the steering wheel to open and close said slats of the window blind.

18. The method of using an existing window blind to block glare from oncoming vehicle headlights, according to claim 17, wherein a single 360 degree rotation of said rotatable rod fully opens the window blind and a single 360 degree rotation of the rotatable rod in a direction opposite the direction of said single 360 degree rotation of the rotatable rod fully closes the window blind.

19. The method of using an existing window blind to block glare from oncoming vehicle headlights, according to claim 15, further comprising detachably connecting the end of said bottom rail opposite the driver's side to said dashboard's upper surface to help maintain the window blind in a substantially vertical position during vehicle movement.

20. The method of using an existing window blind to block glare from oncoming vehicle headlights, according to claim 15, wherein the window blind has slat raising means and operating the slat raising means to retract the slats to a raised position during daytime driving.

21. The method of using an existing window blind to block glare from oncoming vehicle headlights, according to claim 20 wherein said slat raising means has one lift cord to raise the right side of the slats and a second lift cord to raise the left side of the slats, and connecting the lift cords by a suction cup to the upper inside surface of the driver's side of the slanted front windshield to retain the lift cords out of the driver's vision path when the window blind is retracted during daylight driving.

22. The method of using an existing window blind to block glare from oncoming vehicle headlights, according to claim 15, further comprising connecting said wire extending toward the lower inside of the slanted front windshield to the lower portion of the slanted front windshield by a suction cup.

* * * * *